Patented Feb. 17, 1942

2,273,443

UNITED STATES PATENT OFFICE 2,273,443

ORGANIC MERCURY COMPOUND

Heinrich Klös, Wuppertal-Elberfeld, Germany, assignor to Winthrop Chemical Company, Inc., New York, N. Y., a corporation of New York No Drawing. Application March 8, 1938, Serial No. 194,549. In Germany March 8, 1937

2 Claims. (Cl. 260—299)

This invention relates to new organic mercury compounds and to a process for preparing the same.

It has been proposed to employ alkyl mercury compounds, in which one valency of the mercury is attached to an acid residue, to the OH-group or sulphur, as dry seed grain disinfectants and disinfecting agents. Certain compounds of this series are rather volatile and cause irritation. For the disinfection of seed grain it has further been suggested to employ certain organic mercury nitrogen compounds such as aryl or alkoxyalkyl compounds of this series and also alkyl mercury nitrogen compounds which contain a residue of a carboxylic acid group bound to the nitrogen atom.

The present invention relates to a new class of organic mercury compounds i. e. alkyl mercury nitrogen compounds of the type

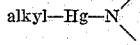

in which the residue containing nitrogen does not contain a carboxylic acid group and in which the alkyl residue is not substituted. The new compounds are particularly suitable as fungicidal and bactericidal agents, especially for disinfecting seed grain. By way of example they may further be employed for preserving wood, for coating ships bottoms and for the disinfection for instance of surgical instruments.

The new compounds are distinguished from the known alkyl mercury nitrogen compounds which contain a carboxylic acid residue attached to the mercury atom in that they are less volatile and can be more easily handled because they have practically no irritating effect. Compared with the known organic mercury nitrogen compounds the new compounds exhibit a much greater fungicidal efficacy.

The new compounds are employed as seed grain disinfectants or immunizing agents in the presence of a solvent or a diluent. As diluents, when using the compounds as dry seed grain disinfectants, for instance kaolin, calcium sulphate, chalk, sawdust, sodium carbonate or calcium naphthol pitch sulphonate may be used. When using the compounds as wet seed dressing or disinfecting agents water, alcohol and acetone come into consideration. Also other fungicidal substances may be mixed with the new alkyl mercury compounds, such as for instance arsenic oxide, methyl arsine sulfide, methyl arsine oxide, phenyl mercury acetate and methoxyethyl mercury chloride. The seed grain disinfectants thus obtained are preferably employed in a mercury concentration of about 1 to about 3%.

The ratio between dosis toxica and dosis curativa may be still further improved by adding adsorbents or absorbents such as active charcoal, silica gel or diatomaceous earth to the new compounds when they are used as dry seed grain disinfecting agents.

As nitrogenous residues there come into consideration, for instance, the imidazole, triazole, pyrrole, indole, succinimide, thiomorpholine, phthalimide, sulfonamides, ortho-benzoic acid sulfonimide, dicyandiamide, purine, pseudothiohydantoin and allantoin residues. Alkyl mercury nitrogen compounds in which the nitrogen is cyclically bound particularly those containing the residue of naphtholsultamic acid have proved to be particularly suitable.

As alkyl residues there may be mentioned by way of example the methyl, ethyl, propyl and butyl residues. Particularly the lower members of the series such, for instance, as the methyl mercury naphthosultamic acid have proved to be very efficacious. Other suitable compounds are for instance: methyl mercury succinimide, ethyl mercury imidazole, butyl mercury naphthosultamic acid, propyl mercury naphthosultamic acid, ethyl mercury 5.5-diethylbarbituric acid, methyl mercury 5-phenyl-5-ethylbarbituric acid, ethyl mercury phtalimide, methyl mercury ortho-benzoic acid sulfonimide and propyl mercury indene.

The manufacture of the alkyl mercury compounds of the kind defined above is best effected by causing alkyl mercury salts, oxides or hydroxides the alkyl group of which is unsubstituted, to react on nitrogen compounds containing attached to the nitrogen atom at least one hydrogen atom which is replaceable by or is replaced by a metal, which nitrogen is not linked to a group containing a carboxylic acid radical. The reaction is advantageously carried out in the presence of a solvent such as water or an organic solvent. If the alkyl mercury compounds are employed in the form of their salts the reaction is preferably effected with the metal compounds, preferably the alkali metal compounds of the nitrogenous reactants; in this case the reactant may also be carried out with the addition of acid-binding agents, such as alkaline reacting substances.

By performing the reaction in the presence of an inert carrier such as talc a dry seed grain disinfectant ready for use may be obtained.

Since the above described reaction takes places very easily for instance in the presence of water it is also possible to employ a mixture of the reaction components, in which the components are maintained inert towards each other for instance by admixture of suitable fillers, instead of the finished alkyl mercury nitrogen compounds, for the dressing of seed. In the presence of water such as the humidity of the soil the reaction components are transformed into the desired alkyl mercury nitrogen compounds.

The following examples illustrate the manufacture of the new compounds and their manner of application, the parts being by weight unless otherwise stated:

*Example 1*

To a solution of 41 parts of naphthosultamic acid in 320 parts of methanol a solution of 46.4 parts of methyl mercury hydroxide in 160 parts of alcohol is added drop by drop at room temperature while vigorously stirring. The crystalline precipitate is filtered with suction and, if necessary, recrystallized from boiling alcohol. The N(methyl mercury) naphthosultamic acid is a yellowish compound which is practically insoluble in water, ether and benzene and which is extremely difficultly soluble in cold alcohol. It is more readily soluble in hot acohol and in methanol. It does not yield the reaction of ionic mercury. Only when boiled for a prolonged time with strong hydrochloric acid is part of the mercury transformed into the ionic form. Moreover the linkage between the mercury and the nitrogen atom is not or only to a small extent destroyed by treatment with dilute acids and alkalies. When heated to 251° C. the compound remains unchanged. At higher temperatures the compound changes somewhat in color and melts at 256–257° C. with decomposition. Analysis yields values for nitrogen, sulphur and mercury in accordance with theory.

The same compound may be obtained by dissolving 41 parts of naphthosultamic acid in 320 parts of N/2 caustic soda solution and by adding to this filtered solution a solution of 55.4 parts of methyl mercury nitrate in 400 parts of water while stirring.

Rye seed infected by fusarium, which has been treated with a dry seed disinfectant containing 2% N(methyl mercury) naphthosultamic acid and which has been dusted in the proportion of 2:1000 shows attack by fusarium to the extent of only 1.4% while of the plants produced from the untreated seed grain 25.3% are attacked.

Pine wood which has been treated with a methanol solution containing 0.1% of N(methyl mercury) naphthosultamic acid is no longer attacked by the wood fungus Coniophora.

*Example 2*

26.5 parts of ethyl mercury chloride are dissolved in 850 parts of alcohol and mixed with an alcoholic solution of 17 parts of silver nitrate. The solution is filtered with suction from the silver chloride, the alcohol is removed by distillation and the residue is dissolved in 500 parts of water. On adding a solution of 25.4 parts of the sodium salt of 5-phenyl-5-ethyl barbituric acid in 200 parts of water a milky turbidity is caused and soon a white mass separates.

Instead of the solution of the finished sodium salt also a solution of 23.2 parts of 5-phenyl-5-ethyl barbituric acid in 100 parts of N-caustic soda solution and 100 parts of water may be employed.

The new compound is nearly a white powder which soon changes its color somewhat when exposed to air. It is difficultly soluble in water and easily soluble in acetone and alcohol. It melts at about 87–92° C. The substance is split up on heating with aqua regia; after diluting with water, on the addition of ammonia and ammonium sulfide a test portion yields a precipitate of black mercury sulfide.

*Example 3*

309 parts of ethyl mercury bromide, 205 parts of naphthosultamic acid and 16,000 parts by volume of methanol are heated on the water bath whereby solution takes place. A solution of sodium methylate prepared from 23 parts of sodium and 500 parts by volume of methanol is added. On the addition of water faintly yellow colored crystals melting at 204° C. separate of the N(ethyl mercury) naphthosultamic acid. If 337 parts of butyl mercury bromide are employed instead of ethyl mercury bromide n-butyl mercury naphthosultamic acid is obtained in well formed platelets. These compounds show the same properties towards acids and alkalies as the compounds described in Example 1.

In suitable admixture with carriers such as solvents and fillers for instance alcohol, talcum or chalk the said alkyl mercury compounds may be used as bactericidal and fungicidal media. They may be employed by way of example for the preservation of wood, as coatings for ships bottoms, for disinfections and particularly as seed dressings.

I claim:

1. An alkyl mercury naphthosultamic acid of the formula

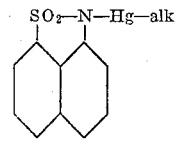

in which alk stands for an unsubstituted alkyl radical containing from 1–4 carbon atoms.

2. Methyl mercury naphthosultamic acid of the formula

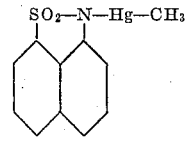

HEINRICH KLÖS.